(12) United States Patent
Paerewyck et al.

(10) Patent No.: US 11,053,972 B2
(45) Date of Patent: Jul. 6, 2021

(54) PIVOT JOINT ASSEMBLY

(71) Applicant: Federal-Mogul Motorparts LLC, Southfield, MI (US)

(72) Inventors: Sidney Paerewyck, Aalst (BE); Johannes Kankare, Woluwe-St-Lambert (BE)

(73) Assignee: Federal-Mogul Motorparts LLC, Southfield, MI (US)

( * ) Notice: Subject to any disclaimer, the term of this patent is extended or adjusted under 35 U.S.C. 154(b) by 75 days.

(21) Appl. No.: 16/354,324

(22) Filed: Mar. 15, 2019

(65) Prior Publication Data
US 2019/0283515 A1    Sep. 19, 2019

Related U.S. Application Data

(60) Provisional application No. 62/643,954, filed on Mar. 16, 2018.

(51) Int. Cl.
*F16C 11/06*    (2006.01)

(52) U.S. Cl.
CPC ...... *F16C 11/0633* (2013.01); *F16C 11/0647* (2013.01); *F16C 2208/32* (2013.01); *F16C 2208/66* (2013.01); *F16C 2326/05* (2013.01); *Y10T 403/32737* (2015.01)

(58) Field of Classification Search
CPC .............. F16C 11/0628; F16C 11/0633; F16C 11/0638; F16C 11/0647; F16C 11/0652; F16C 23/045; F16C 29/02; F16C 33/202; F16C 2208/32; F16C 2208/66; F16C 2220/04; F16C 2326/05; Y10T 403/32041; Y10T 403/32057; Y10T 403/32065; Y10T 403/32073; Y10T 403/32196; Y10T 403/32204;
(Continued)

(56) References Cited

U.S. PATENT DOCUMENTS

| 3,120,746 A | 2/1964 | Kayser |
| 6,010,272 A | 1/2000 | Littman |
| 6,042,294 A | 3/2000 | Urbach |

(Continued)

FOREIGN PATENT DOCUMENTS

| EP | 1348611 A1 | 10/2003 |
| WO | 2018165082 A1 | 9/2018 |

OTHER PUBLICATIONS

Specification Translation of EP 1348611. Houdayer, et al. Fixation for a pivotable vehicle wheel. Oct. 1, 2003.*

(Continued)

*Primary Examiner* — Josh Skroupa
(74) *Attorney, Agent, or Firm* — Robert L. Stearns; Dickinson Wright, PLLC

(57) ABSTRACT

The pivot joint assembly includes a housing with an opening which extends along an axis. A bearing is received in the opening and which has a cylindrical outer surface that is in slidable contact with another surface so that the bearing can slide in an axial direction relative to the housing. The bearing has a curved inner bearing surface. The pivot joint assembly also includes an inner ring with a curved outer surface that is in slidable contact with the curved inner bearing surface of the bearing so that the inner ring can rotate and articulate relative to the housing.

6 Claims, 3 Drawing Sheets

(58) Field of Classification Search
CPC ..... Y10T 403/32229; Y10T 403/32631; Y10T 403/32737
USPC ...... 403/57, 58, 59, 60, 61, 76, 77, 80, 122, 403/135
See application file for complete search history.

(56) References Cited

U.S. PATENT DOCUMENTS

| | | | |
|---|---|---|---|
| 7,037,023 B2 | 5/2006 | Monninghoff et al. | |
| 8,033,748 B2 | 10/2011 | Krome | |
| 8,226,297 B2 | 7/2012 | Laal Riahi et al. | |
| 8,235,622 B2 * | 8/2012 | Brunneke | F16C 11/0633 403/135 |
| 8,550,741 B2 | 10/2013 | Kuroda | |
| 8,596,900 B2 * | 12/2013 | Diener | F16C 11/0652 403/135 |
| 8,746,980 B2 | 6/2014 | Oki et al. | |
| 8,864,155 B2 | 10/2014 | Kuroda | |
| 8,988,495 B2 | 4/2015 | Hirose et al. | |
| 9,458,885 B2 | 10/2016 | Ishii et al. | |
| 9,951,820 B2 * | 4/2018 | Dowie | F16C 7/06 |
| 10,288,173 B2 * | 5/2019 | Chapagain | F16C 11/06 |
| 10,626,914 B2 * | 4/2020 | Nishinakama | F16C 11/0614 |
| 2009/0080967 A1 * | 3/2009 | Gercke | F16C 11/0633 403/135 |
| 2010/0109274 A1 | 5/2010 | Diener et al. | |
| 2015/0133351 A1 | 5/2015 | Pasternak et al. | |
| 2016/0097454 A1 | 4/2016 | Chapagain et al. | |
| 2018/0258982 A1 | 9/2018 | Sellers | |

OTHER PUBLICATIONS

International Search Report, dated Jun. 14, 2019 (PCT/US2019/022438).

\* cited by examiner ered part of the disclosure of this application and
PIVOT JOINT ASSEMBLY

CROSS-REFERENCE TO RELATED APPLICATION

This U.S. patent application claims the benefit of U.S. Provisional Patent Application Ser. No. 62/643,954, filed Mar. 16, 2018, entitled "IMPROVED PIVOT JOINT ASSEMBLY," the entire disclosure of the application being considhereby incorporated by reference.

BACKGROUND OF THE INVENTION

1. Field of the Invention

The present invention is related, generally, to a pivot joint for pivotably attaching a pivot support with a steering knuckle in a vehicle steering and suspension system.

2. Related Art

Pivot joints are commonly found in vehicle suspension assemblies for operably attaching a knuckle with a pair of control arms in order to allow the knuckle and control arms to rotate and articulate relative to one another during operation of the vehicle. Such pivot joints could take a range of different configurations including configurations with and without ball studs. There is a continuing need for improved pivot joints which can be installed in a vehicle more easily, can be manufactured more cost effectively, and which offer improved durability.

SUMMARY OF THE INVENTION AND ADVANTAGES

One aspect of the present invention is related to a pivot joint assembly that includes a housing and wherein the housing has an opening which extends along an axis. The pivot joint assembly also includes a bearing which is received in the opening of the housing and which has a cylindrical outer surface that is in slidable contact with another surface so that the bearing can slide in an axial direction relative to the housing. The bearing has a curved inner bearing surface. The pivot joint assembly also includes an inner ring with a curved outer surface that is in slidable contact with the curved inner bearing surface of the bearing so that the inner ring can rotate and articulate relative to the housing.

According to another aspect of the present invention, an outer ring is received in the opening of the housing and has a cylindrical inner surface and wherein the surface that is in slidable contact with the cylindrical outer surface of the bearing is the cylindrical inner surface of the outer ring.

According to yet another aspect of the present invention, the bearing is made as a monolithic piece of a material which consists of 8-12 wt % Polytetrafluoroethylene (PTFE), 2-6 wt % carbon fibers, and the remainder is of polyoxymethylene (POM).

According to still another aspect of the present invention, the housing has a bottom wall.

According to a further aspect of the present invention, the bottom wall has a raised portion which has an annular shape and which surrounds a recessed portion that is recessed relative to the raised portion.

According to yet a further aspect of the present invention, the bearing can slide in the axial direction until a portion of the bearing is axially located between the raised portion and the recessed portion and can slide such that the bearing is entirely located on an opposite side of the raided portion from the recessed portion.

According to still a further aspect of the present invention, the housing is made as a monolithic piece of metal.

According to another aspect of the present invention, the housing presents at least three bolt openings which are separate from the opening that extends along the axis.

According to yet another aspect of the present invention, the bearing includes a plurality of slits which are circumferentially spaced from one another by fingers and wherein the fingers are flexible in a radial direction for receiving and capturing the inner ring.

Another aspect of the present invention is related to a vehicle suspension system. The vehicle suspension system includes a knuckle, a control arm, and a joint assembly. The joint assembly operably connects the knuckle with the control arm while providing the knuckle with three rotational degrees of freedom and one translational degree of freedom for moving relative to the control arm. The joint assembly includes a housing which is fixedly attached with the control arm. The housing has an opening which extends along an axis. A bearing is received in the opening of the housing. The bearing has a cylindrical outer surface that is in slidable contact with another surface so that the bearing can slide in an axial direction relative to the housing. The bearing has a curved inner bearing surface. The joint assembly further includes an inner ring that has a curved outer bearing surface that is in slidable contact with the curved inner bearing surface of the bearing so that the inner ring can rotate and articulate relative to the housing. The inner ring is fixedly attached with the knuckle.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENT

Figure 1:
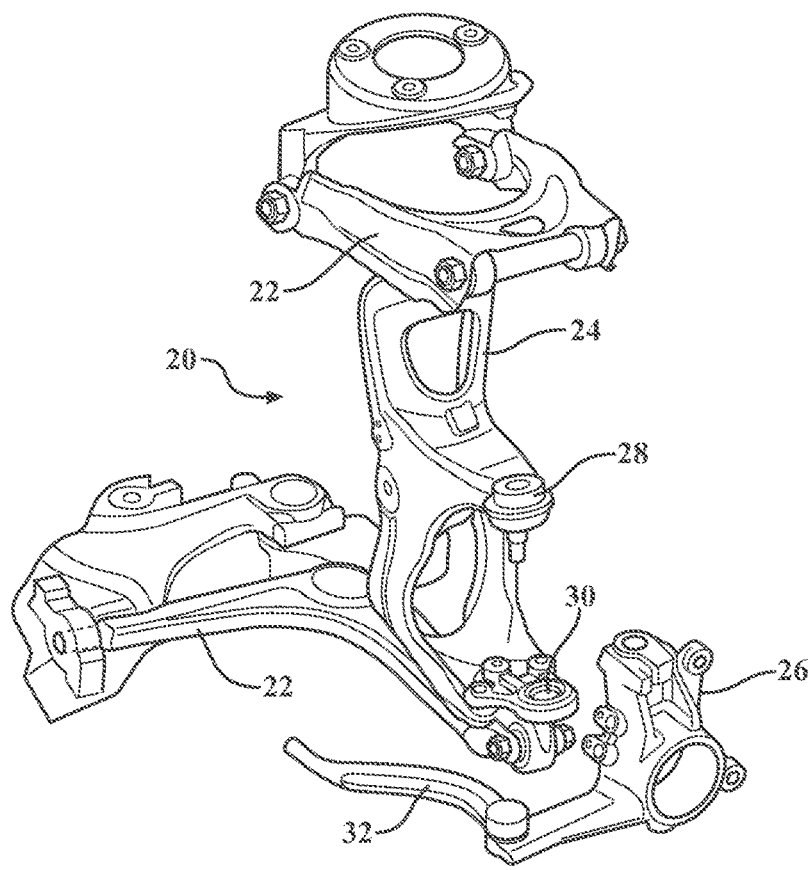
FIG. 1 is a perspective view of an exemplary suspension assembly and showing a knuckle being separated therefrom.
Figure 2:
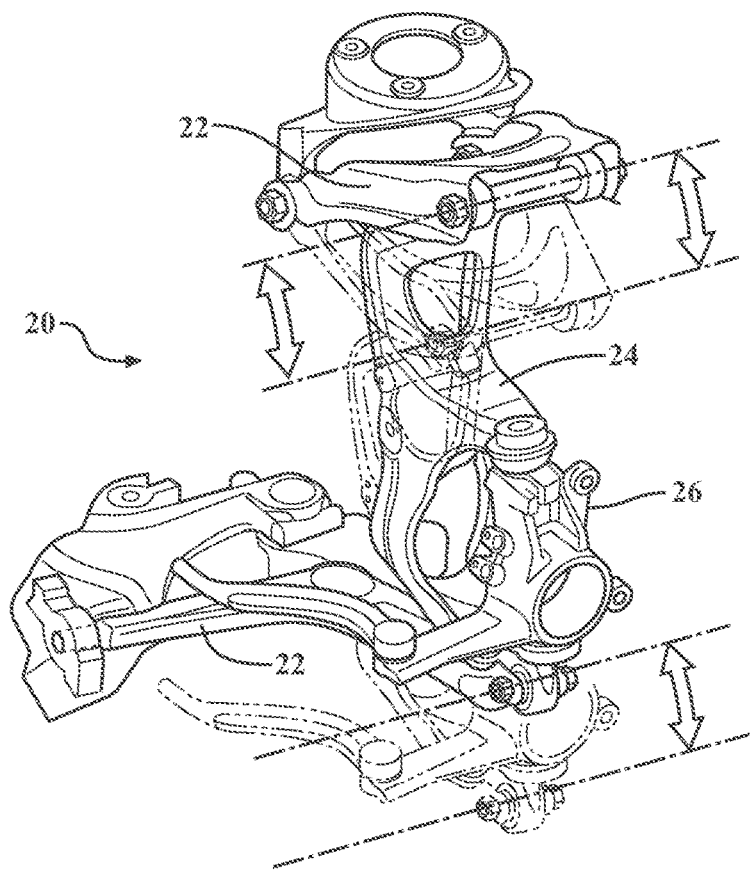
FIG. 2 is another perspective view of the exemplary suspension assembly and illustrating movement of the control arms and knuckle in a vertical direction.
Figure 3:
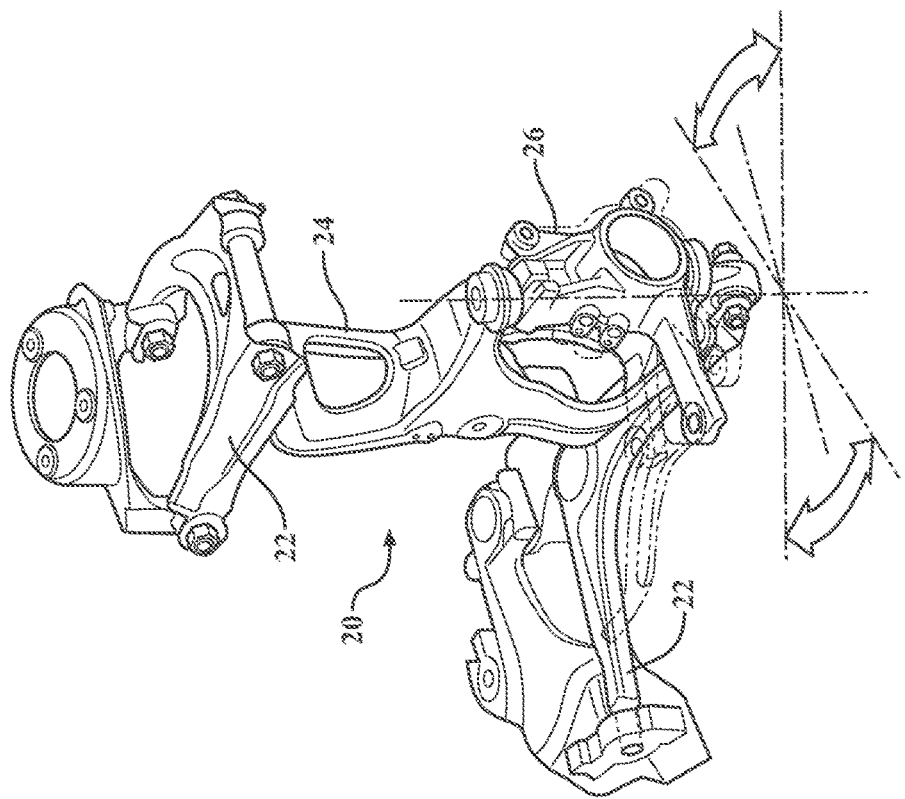
FIG. 3 is another perspective view of the exemplary suspension assembly and illustrating movement of the knuckle in a rotating direction about a vertical axis.
Figure 5:
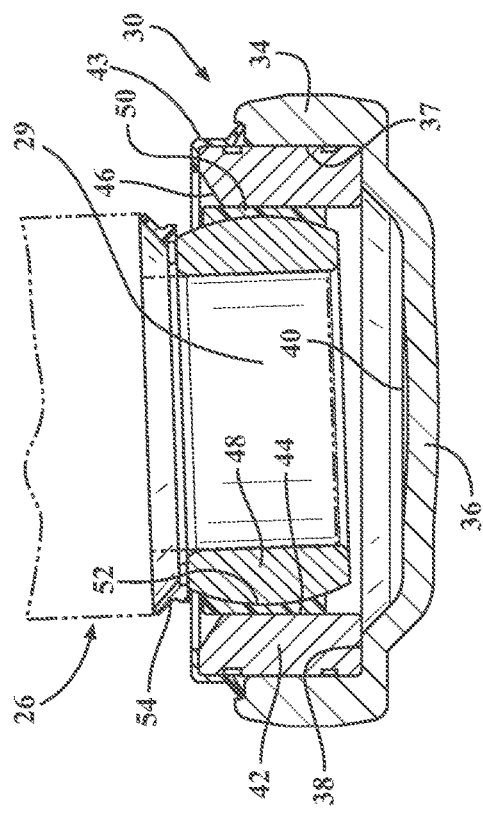
FIG. 5 is a cross-sectional view of the pivot joint in one configuration.
Figure 6:
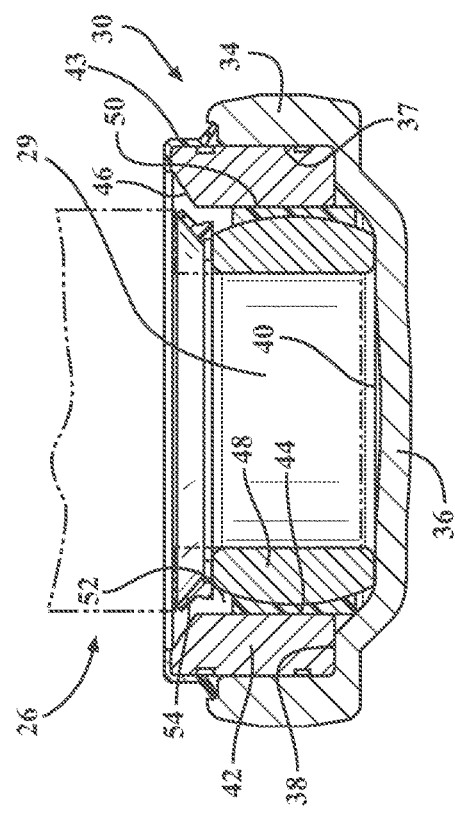
FIG. 6 is a cross-sectional view of the pivot joint assembly in another configuration.

Referring to the Figures, wherein like numerals indicate corresponding parts throughout the several views, a vehicle suspension system 20 is generally shown in FIGS. 1-3. The exemplary suspension system 20 includes a pair of vertically spaced apart control arms 22 and a single-piece pivot support 24 which extends between and is operatively attached with the control arms 22. A knuckle 26 is operably attached with the pivot support 24 via a pair of joints 28, 30, namely an upper joint 28 and a lower joint 30. As shown in FIG. 2, as the control arms 22 pivot in sync with one another up and down, the pivot support 24 and the knuckle 26 translate with generally fixed orientations so that a wheel which is operably connected with the knuckle 26 does not pivot.

The upper joint 28 has the form of a ball joint which has a ball joint housing that is received in an opening in the pivot support 24. The upper joint 28 also has a ball stud which extends downwardly for attachment with the knuckle 26. The lower joint 30 is a pivot joint which has an opening that receives a downwardly extending post 29 (shown in FIGS. 5-8) in the knuckle 26. The ball stud of the upper joint 28 and a central location of the opening of the lower joint 30 are aligned with one another about a common central axis A. As shown in FIG. 3, the axial alignment of the upper and lower joints 28, 30 allows the knuckle 26 and a wheel (not shown) attached thereto to pivot about the central axis A in response to steering input from a tie rod 32 that is attached with the knuckle 24.

Figure 4:
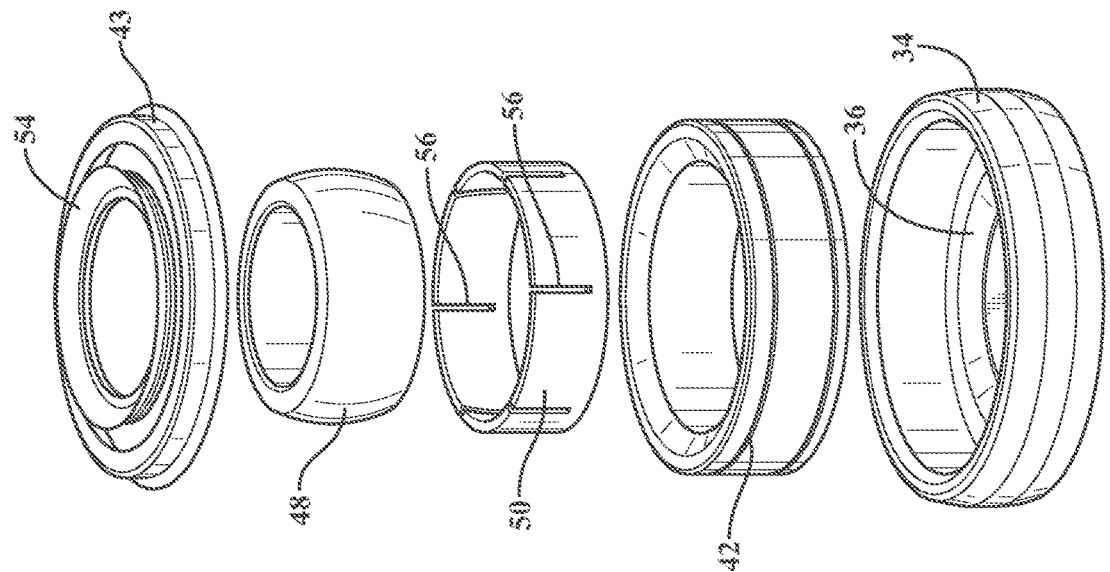
FIG. 4 is a perspective and exploded view of an exemplary pivot joint assembly for the suspension assembly of FIGS. 1-3.

Referring now to FIG. 4, the lower joint 30 has a housing 34 with a cup-shaped opening which is defined by a bottom wall 36 and a side wall 37. The opening extends along the central axis A from the bottom wall 36 at a closed first end to an open second end. The bottom wall 36 has an annular raised portion 38 which surrounds a recessed central portion 40. The central axis A extends through the recessed central portion 40. The annular raised portion 38 is planar and extends to a bottom end of the side wall 37.

The housing 34 is preferably made of a single, monolithic piece of metal, such as steel or an alloy steel, and is preferably shaped through forging or casting and then machining to establish the final form of the cup-shaped opening. In the exemplary embodiment, the housing 34 has three bolt openings which receive bolts to fixedly attach the housing 34 with the pivot support 24. However, it should be appreciated that the housing 34 could take other shapes and configurations and may be fixedly attached with the pivot support 24 through any suitable fastening means.

An outer ring 42 is fixedly received in the cup-shaped opening of the housing 34 and abuts the raised portion 38 of the bottom wall 36 of the housing 34. In the Exemplary embodiment, the outer ring 42 is press fit into the opening of the housing 34 such that, once installed, the outer ring 42 remains in a fixed location within the opening of the housing 34. A cap 43 is also fixed with the housing 34 and the outer ring 42 to fixedly attach these components together. When in an assembled position, the outer ring 42 projects out of the cup-shaped opening of the housing 34 in an axial direction. The outer ring 42 has an inner surface which has a major portion 44 with a generally constant diameter. The major portion 44 extends axially from adjacent the bottom wall 36 of the housing 34 to a tapered portion 46 which tapers radially outwardly and which is located, axially, outside of the cup-shaped opening of the housing 34. The outer ring 42 may be made of metal or plastic and may be shaped through any suitable operation.

The lower joint 30 further includes an inner ring 48 that has a through opening which is shaped to receive the post 29 of the knuckle 26 and includes a plastic bearing 50 which is disposed between the outer and inner rings 42, 48. In the exemplary embodiment, the inner ring 48 is press-fit onto the post 29 such that, once attached, these components move with one another. The inner ring 48 is preferably made of metal, such as steel, and has a semi-spherically curved outer face.

Figure 7:
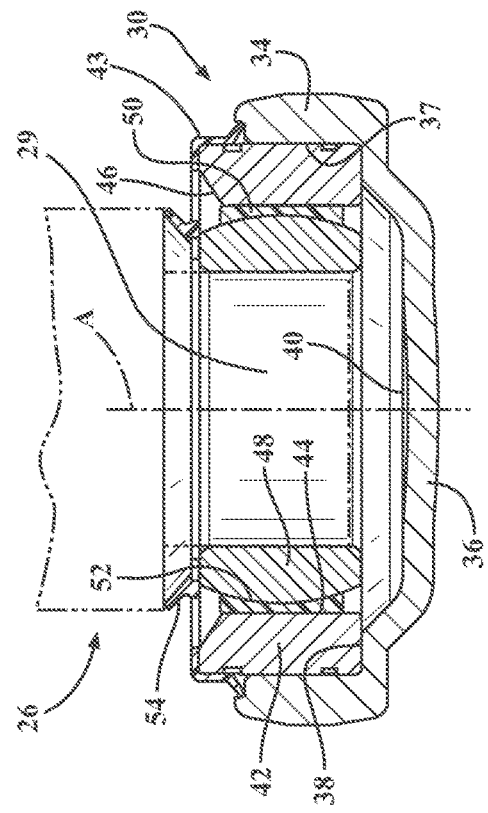
FIG. 7 is a cross-sectional view of the pivot joint assembly in yet another configuration.

A bearing 50 is disposed in the opening of the housing between the outer and inner rings 42, 48 for allowing these components to freely rotate relative to one another during operation of the vehicle suspension system 20. Specifically, the bearing 50 is made of a low-friction material and has a semi-spherically curved inner face 52 that is in slidable contact with the curved outer face of the inner ring 48 to allow the inner ring 48 and the knuckle 26 to freely rotate about the central axis A (as shown in FIG. 3) and to freely articulate, or pivot, relative to the outer ring 42. For example, FIG. 7 shows the inner ring 48 as being articulated relative to the bearing 50 and to the housing 34. In other words, the slidable relationship between the inner ring 48 and the bearing 50 gives the knuckle 26 three rotational degrees of freedom by allowing it to rotate and articulate relative to the housing 34 and to the control arm 22 (shown in FIG. 1) affixed thereto and vice versa. As discussed in further detail below, the bearing 50 is preferably made of a low friction plastic material and is preferably shaped through an injection molding operation.

Figure 8:
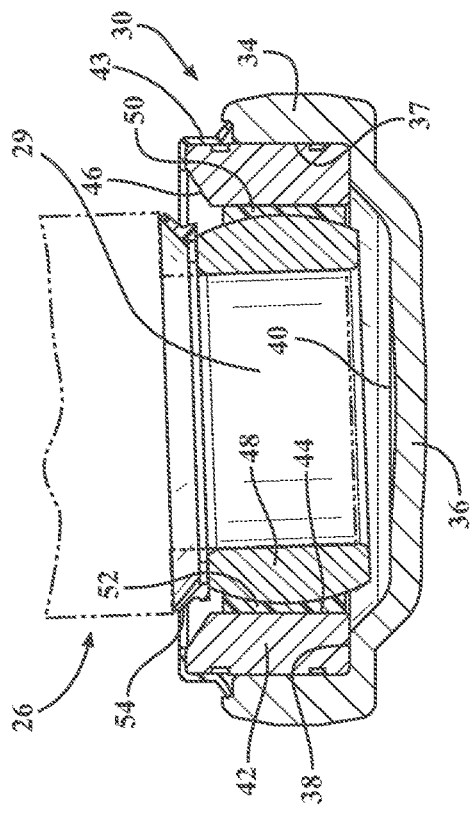
FIG. 8 is a cross-sectional view of the pivot joint assembly in still another configuration.

The bearing 50 has an axial length which is less than an axial lengths of the outer and inner rings 42,48. In operation, an outer surface of the plastic bearing 50 can slide axially along the inner surface of the outer ring 42. As shown in FIG. 8, the slidable relationship between bearing 50 and the outer ring 42 in combination with the configuration of the recessed portion 40 of the bottom wall 36 allows the inner ring 48 and the plastic bearing 50 to slide axially downwardly until both the inner ring 48 and the plastic bearing 50 are partially below the outer ring 42. In other words, the slidable relationship between the plastic bearing 50 and the outer ring 48 provides the knuckle 26 with one translational degree of freedom by allowing it to translate relative to the control arm 22 (shown in FIG. 1) and vice versa.

As shown in FIG. 4, the bearing 50 has a plurality of circumferentially spaced apart and axially extending slots 56 formed therein. The slots 56 extend to one axial end of the bearing 50 and separate a plurality of fingers which can flex radially outwardly in an elastic manner when inserting the inner ring 48 into a cavity defined by the inner face 52 of the bearing 50. Once a maximum outer diameter of the inner ring 48 clears the distal ends of the fingers, the fingers snap radially inwardly to capture the inner ring 48 within the bearing 50 while still allowing these components to rotate and articulate relative to one another.

The bearing 50 is preferably made of a material which consists of: 8-12 wt % Polytetrafluoroethylene (PTFE), 2-6 wt % carbon fibers, and the remainder is of polyoxymethylene (POM). This material has been found to provide the bearing 50 with low friction; sufficient strength to transfer forces between the outer and inner rings 42, 48 without damage; and sufficient elasticity to deflect when receiving the inner ring 48 therein during assembly of the lower joint 30.

The lower joint 30 further includes a dust boot 54 which is sealed against the inner ring 48 and is sealable against the knuckle 26 for maintaining a lubricant within and keeping contaminants out of the lower joint 30. The dust boot 54 may be fixedly attached with the inner ring 48 through any suitable means including, e.g., an adhesive.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:

1. A pivot joint assembly, comprising:
a housing with an opening which extends along an axis;
said housing has a bottom wall, said bottom wall including a raised portion which has an annular shape and which surrounds a recessed portion that is recessed relative to said raised portion;
a bearing received in said opening of said housing and having a cylindrical outer surface that is in slidable contact with another surface so that said bearing can slide in an axial direction relative to said housing;
said bearing having a curved inner bearing surface; and
an inner ring having a curved outer bearing surface that is in slidable contact with said curved inner bearing surface of said bearing so that said inner ring can rotate and articulate relative to said housing;
wherein said bearing can slide in said axial direction until a portion of said bearing is axially located between said raised portion and said recessed portion and can slide such that said bearing is entirely located on an opposite side of said raised portion from said recessed portion.

2. The pivot joint assembly as set forth in claim 1 further including an outer ring which is received in said opening of said housing and which has a cylindrical inner surface and wherein said surface that is in slidable contact with said cylindrical outer surface of said bearing is said cylindrical inner surface of said outer ring.

3. The pivot joint as set forth in claim 1 wherein said bearing is made as a monolithic piece of a material which consists of 8-12 wt % Polytetrafluoroethylene (PTFE), 2-6 wt % carbon fibers, and the remainder is of polyoxymethylene (POM).

4. The pivot joint as set forth in claim 1 wherein said housing is made as a monolithic piece of metal.

5. The pivot joint as set forth in claim 4 wherein said housing presents at least three bolt openings which are separate from said opening that extends along said axis.

6. The pivot joint as set forth in claim 1 wherein said bearing includes a plurality of slots which are spaced circumferentially from one another by fingers and wherein said fingers are flexible in a radial direction for receiving and capturing said inner ring.

* * * * *